(12) United States Patent
Onodera et al.

(10) Patent No.: US 7,803,884 B2
(45) Date of Patent: Sep. 28, 2010

(54) BLOCK COPOLYMERS AND USE THEREOF

(75) Inventors: Toru Onodera, Tsukuba (JP); Shigeru Sasaki, Tsukuba (JP); Daizaburo Yashiki, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1093 days.

(21) Appl. No.: 10/575,949

(22) PCT Filed: Oct. 15, 2004

(86) PCT No.: PCT/JP2004/015666

§ 371 (c)(1),
(2), (4) Date: Apr. 13, 2006

(87) PCT Pub. No.: WO2005/037892

PCT Pub. Date: Apr. 28, 2005

(65) Prior Publication Data

US 2007/0066759 A1 Mar. 22, 2007

(30) Foreign Application Priority Data

Oct. 17, 2003 (JP) ............................. 2003-357441

(51) Int. Cl.
*C08F 297/02* (2006.01)
*H01M 8/10* (2006.01)
*C08L 65/00* (2006.01)
*C08L 71/12* (2006.01)

(52) U.S. Cl. .................... 525/535; 525/326.1; 525/534; 525/906; 528/171; 528/174; 528/391

(58) Field of Classification Search ................. 525/535, 525/471, 906, 242, 390, 534, 191, 326.1, 525/328.5; 429/27, 30, 13; 528/171, 174, 528/391
See application file for complete search history.

(56) References Cited

U.S. PATENT DOCUMENTS

| | | | |
|---|---|---|---|
| 5,741,408 A | 4/1998 | Helmer-Metzmann et al. | |
| 5,834,566 A | 11/1998 | Helmer-Metzmann et al. | |
| 6,761,989 B2 | 7/2004 | Terahara et al. | |
| 2001/0021764 A1* | 9/2001 | Weisse et al. ............... | 528/171 |
| 2003/0180596 A1 | 9/2003 | Yoshimura et al. | |
| 2004/0101730 A1 | 5/2004 | Hirano et al. | |
| 2005/0069780 A1 | 3/2005 | Kinouchi et al. | |
| 2007/0083010 A1 | 4/2007 | Onodera et al. | |

FOREIGN PATENT DOCUMENTS

| | | |
|---|---|---|
| CN | 1446828 A | 10/2003 |
| EP | 1 394 879 A1 | 3/2004 |
| EP | 1 449 886 A1 | 8/2004 |
| JP | 8-20716 A | 1/1996 |
| JP | 2001-250567 A | 9/2001 |
| JP | 2003-017090 | 1/2003 |
| JP | 2003-31232 A | 1/2003 |
| JP | 2003-155361 | 5/2003 |
| JP | 2003-292609 A | 10/2003 |
| JP | 2004-263052 | 9/2004 |
| JP | 2004-359925 | 12/2004 |
| JP | 2004-363052 A | 12/2004 |
| WO | WO 02/25764 A1 | 3/2002 |
| WO | WO 02/091507 A1 | 11/2002 |
| WO | WO-03046080 A1 * | 6/2003 |
| WO | WO 03/095509 A1 | 11/2003 |
| WO | WO 2004/042839 A2 | 5/2004 |
| WO | WO 2005/030840 A1 | 4/2005 |

OTHER PUBLICATIONS

Mecham, J. et al, Polymer Preprints vol. 41(2) pp. 1388-1389, published in Aug. 2000.*
Ghassemi, H. et al., "New Multiblock copolymers of sulfonated poly (4'-phenyl-2,5-benzophe none) and poly (arylene ether sulfone) for proton exchange membrane", Polymer Preprints, vol. 44, No. 1, Mar. 2003, pp. 814-815.
Gan, Daoji et al., "Synthesis and characterization of poly(ether ketone ketone) (PEKK)/sodium sulfonated poly(arylene ether ketone) (S-PAEK) block copolymers", Polymer International, vol. 50, pp. 812-816.
Office Action mailed Jun. 30, 2009, received in corresponding Japan Application No. 2004-264988.

* cited by examiner

*Primary Examiner*—Irina S Zemel
*Assistant Examiner*—Jeffrey Lenihan
(74) *Attorney, Agent, or Firm*—Foley & Lardner LLP

(57) ABSTRACT

A block copolymer comprising at least one segment having an acid group and at least one segment substantially free from acid groups is provided wherein the segment substantially free from acid groups contains a structure of the following general formula (1):

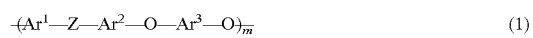

$$-(Ar^1-Z-Ar^2-O-Ar^3-O)_m- \qquad (1)$$

(wherein, m represents an integer of 10 or more, $Ar^1$, $Ar^2$ and $Ar^3$ represent mutually independently a divalent aromatic group which may be substituted by an alkyl group having 1 to 10 carbon atoms, an alkoxy group having 1 to 10 carbon atoms, an aryl group having 6 to 10 carbon atoms or an aryloxy group having 6 to 10 carbon atoms, and Z represents —CO— or —$SO_2$—, each Z in the segments representing independently —CO— or —$SO_2$—). The block copolymer exhibits more excellent performances as a polymer electrolyte for fuel cells or the like.

12 Claims, No Drawings

BLOCK COPOLYMERS AND USE THEREOF

TECHNICAL FIELD

The present invention relates to a block copolymer, and relates to a block copolymer suitably used for polymer electrolytes, particularly, fuel cells, and to a use thereof.

BACKGROUND ART

As a barrier membrane of electrochemical devices such as primary cells, secondary cells, polymer electrolyte fuel cells and the like, a polymer having proton conductivity, namely, a polymer electrolyte is used. For example, polymer electrolytes containing as an effective component an aliphatic polymer having a perfluoroalkylsulfonic acid as a super strong acid in the side chain and a perfluoroalkane in the main chain typically including Nafion (trademark of E. I. DuPont) are conventionally used because of an excellent power generation property when used as a membrane material or ion exchange component for fuel cells. However, such a kind of materials are said to have problems such as very high cost, low heat resistance, low membrane strength, leading to impracticality unless some reinforcements are applied, and the like.

Under such conditions, development of a low cost polymer electrolyte having excellent properties capable of replacing the above-mentioned polymer electrolyte is being activated recently.

For example, there is suggested a block copolymer having a segment substantially free from an introduced sulfonic acid group and a segment having an introduced sulfonic acid group wherein the former segment is composed of polyether sulfone and the latter segment contains as a repeating unit an ether bonded body of diphenylsulfone with biphenol having a sulfonic acid group (Japanese Patent Application Laid-Open (JP-A) No. 2003-031232).

However, the block copolymer as described above is not sufficiently satisfactory as a polymer electrolyte for fuel cells and the like, and copolymers showing more excellent performances are desired.

DISCLOSURE OF THE INVENTION

The present inventors have intensively studied to find a block copolymer showing more excellent performances as a polymer electrolyte for fuel cells and the like and resultantly found that a block copolymer having a polyether ether sulfone or polyether ether ketone skeleton as the segment substantially free from introduced acid groups shows excellent performances in various properties such as a membrane forming property, chemical stabilities such as oxidation resistance, radical resistance, hydrolysis resistance and the like, membrane mechanical strength, water resistance and proton conductivity and the like, as a proton conductive membrane for polymer electrolytes, particularly, fuel cells, and further investigated variously, leading to completion of the present invention.

That is, the present invention provides [1] A block copolymer comprising at least one segment having an acid group and at least one segment substantially free from acid groups wherein the segment substantially free from acid groups contains a structure of the following general formula (1):

 (1)

(wherein, m represents an integer of 10 or more, $Ar^1$, $Ar^2$ and $Ar^3$ represent mutually independently a divalent aromatic group which may be substituted by an alkyl group having 1 to 10 carbon atoms, an alkoxy group having 1 to 10 carbon atoms, an aryl group having 6 to 10 carbon atoms or an aryloxy group having 6 to 10 carbon atoms. Z represents —CO— or —SO$_2$—, each Z in the segments representing independently —CO— or —SO$_2$—).

Further, the present invention provides [2] The block copolymer according to [1], wherein the weight composition ratio of the segment having an acid group to the segment substantially free from acid groups is 3:97 to 70:30.

Furthermore, the present invention provides [3] The block copolymer according to [1] or [2], wherein the acid group is a strong acid group or a super strong acid group,

[4] The copolymer according to any of [1] to [3], wherein the ion exchange capacity is from 0.1 meq/g to 4 meq/g,

[5] The block copolymer according to any of [1] to [4], wherein the segment substantially free from acid groups is the following general formula (2);

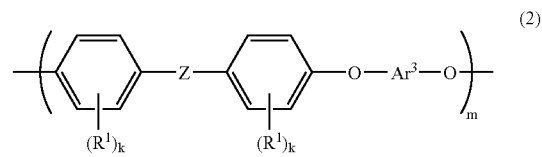 (2)

(wherein, m, Z and $Ar^3$ represent the same meanings as described above. k represents an integer of 0 to 4, and $R^1$ represents an alkyl group having 1 to 10 carbon atoms, an alkoxy group having 1 to 10 carbon atoms, an aryl group having 6 to 10 carbon atoms or an aryloxy group having 6 to 10 carbon atoms),

[6] The block copolymer according to any of [1] to [5], wherein the segment having an acid group contains a structure having an acid group introduced into the following general formula (3);

 (3)

(wherein, n represents an integer of 10 or more. $Ar^4$ and $Ar^5$ represent mutually Independently a divalent aromatic group which may be substituted by an alkyl group having 1 to 10 carbon atoms, an alkoxy group having 1 to 10 carbon atoms, an aryl group having 6 to 10 carbon atoms or an aryloxy group having 6 to 10 carbon atoms. Y represents —CO— or —SO$_2$—, each Y in the segments representing independently —CO— or —SO$_2$—),

[7] The block copolymer according to any of [1] to [5], wherein the segment having an acid group contains a structure having an acid group introduced into the following general formula (4):

 (4)

(wherein, n represents the same meaning as described above. $Ar^6$, $Ar^7$ and $Ar^8$ represent mutually independently a divalent aromatic group which may be substituted by an alkyl group having 1 to 10 carbon atoms, an alkoxy group having 1 to 10 carbon atoms, an aryl group having 6 to 10 carbon atoms or an aryloxy group having 6 to 10 carbon atoms. Y represents the same meaning as described above).

[8] The block copolymer according to any of [1] to [5], wherein the segment having an acid group contains a structure having an acid group introduced into the following general formula (5):

 (5)

(wherein, n represents the same meaning as described above. $Ar^9$ and $Ar^{10}$ represent mutually independently a divalent aromatic group which may be substituted by an alkyl group having 1 to 10 carbon atoms, an alkoxy group having 1 to 10 carbon atoms, an aryl group having 6 to 10 carbon atoms or an aryloxy group having 6 to 10 carbon atoms),

[9] The block copolymer according to [7], wherein the segment having an acid group is the following general formula (6):

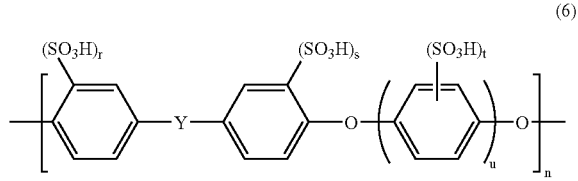

(6)

(wherein, n and Y represent the same meanings as described above. r and s represent each independently 0 or 1, wherein r+s being 1 or 2. t represents 0, 1 or 2, and u represents 1 or 2).

Further, the present invention provides [10] A polymer electrolyte comprising the copolymer according to any of Claims [1] to [9] as an effective component,

[11] A polymer electrolyte membrane comprising the polymer electrolyte according to [10],

[12] A polymer electrolyte composite membrane comprising the polymer electrolyte according to [10], and a porous substrate,

[13] A catalyst composition comprising the polymer electrolyte according to [10],

[14] A polymer electrolyte fuel cell comprising at least one selected from the polymer electrolyte membrane according to [11], the polymer electrolyte membrane according to [12], and the catalyst composition according to Claim [13].

BEST MODES FOR CARRYING OUT THE INVENTION

The present invention is described in detail below.

The block copolymer of the present invention is a block copolymer comprising at least one segment having an acid group and at least one segment substantially free from acid groups, and is characterized in that the segment substantially free from acid groups contains a structure of the formula (1).

Here, the segment substantially free from acid groups includes those in which the content of an acid group per repeating unit constituting the segment is 0.1 or less on average.

$Ar^1$, $Ar^2$ and $Ar^3$ in the formula (1) represent mutually independently a divalent aromatic group, and examples thereof include divalent monocyclic hydrocarbon aromatic groups such as 1,3-phenylene, 1,4-phenylene and the like, divalent condensed hydrocarbon aromatic groups such as 1,3-naphthalenediyl, 1,4-naphthalenediyl, 1,5-naphthalenediyl, 1,6-naphthalenediyl, 1,7-naphthalenediyl, 2,6-naphthalenediyl, 2,7-naphthalenediyl and the like, divalent polycyclic hydrocarbon aromatic groups such as 3,3'-biphenylylene, 3,4'-biphenylylene, 4,4'-biphenylylene, diphenylmethane-4,4'-diyl, 2,2-diphenylpropane-4',4'-diyl, 1,1,1,3,3,3-hexafloro-2,2-diphenylpropane-4',4'-diyl and the like, heterocyclic aromatic groups such as pyridinediyl, quinoxalinediyl, thiophenediyl and the like. Preferable are divalent hydrocarbon aromatic groups.

Here, the divalent aromatic group may be substituted by an alkyl group having 1 to 10 carbon atoms, an alkoxy group having 1 to 10 carbon atoms, an aryl group having 6 to 10 carbon atoms or an aryloxy group having 6 to 10 carbon atoms.

Examples of the alkyl group having 1 to 10 carbon atoms include alkyl group having 1 to 10 carbon atoms such as a methyl group, ethyl group, n-propyl group, isopropyl group, allyl group, n-butyl group, sec-butyl group, tert-butyl group, isobutyl group, n-pentyl group, 2,2-dimethylpropyl group, cyclopentyl group, n-hexyl group, cyclohexyl group, 2-methylpentyl group, 2-ethylhexyl group and the like, alkyl groups obtained by substitution with a halogen atom such as a fluorine atom, chlorine atom, bromine atom and iodine atom, a hydroxyl group, nitrile group, amino group, methoxy group, ethoxy group, isopropyloxy, phenyl, phenoxy or the like on these groups and having a total carbon number including the substituent of 1 to 10, and the like.

Examples of the alkoxy group having 1 to 10 carbon atoms include alkoxy groups having 1 to 10 carbon atoms such as a methoxy group, ethoxy group, n-propyloxy group, isopropyloxy group, n-butyloxy group, sec-butyloxy group, tert-butyloxy group, isobutyloxy group, n-pentyloxy group, 2,2-dimethylpropyloxy group, cyclopentyloxy group, n-hexyloxy group, cyclohexyloxy group, 2-methylpentyloxy group, 2-ethylhexyloxy group and the like, alkoxy groups obtained by substitution with a halogen atom such as a fluorine atom, chlorine atom, bromine atom and iodine atom, a hydroxyl group, nitrile group, amino group, methoxy group, ethoxy group, isopropyloxy, phenyl, phenoxy or the like on these groups and having a total carbon number including the substituent of 1 to 10, and the like.

Examples of the aryl group having 6 to 10 carbon atoms include aryl groups having 6 to 10 carbon atoms such as a phenyl group, naphtyl group and the like, aryl groups obtained by substitution with a halogen atom such as a fluorine atom, chlorine atom, bromine atom and iodine atom, a hydroxyl group, nitrile group, amino group, methoxy group, ethoxy group, isopropyloxy, phenyl, phenoxy or the like on these groups and having a total carbon number including the substituent of 1 to 10, and the like.

Examples of the aryloxy group having 6 to 10 carbon atoms include aryloxy groups having 6 to 10 carbon atoms such as a phenoxy group, naphtyloxy group and the like, aryloxy groups obtained by substitution with a halogen atom such as a fluorine atom, chlorine atom, bromine atom and iodine atom, a hydroxyl group, nitrile group, amino group, methoxy group, ethoxy group, isopropyloxy, phenyl, phenoxy or the like on these groups and having a total carbon number including the substituent of 1 to 10, and the like.

In the formula (1), m represents an integer of 10 or more, and Z represents —CO— or —$SO_2$—, each Z in the segments representing independently —CO— or —$SO_2$—. m represents about 10 to 500, and it is preferable that all of Zs are identical.

$Ar^1$ and $Ar^2$ in the formula (1) represent a divalent aromatic group which may be substituted by a substituent as described above, the divalent aromatic group is preferably a divalent hydrocarbon aromatic group, more preferably phenylene. More preferable examples of the general formula (1) include segments of the above-mentioned general formula (2), and the like, In the formula (2), m, Z and $Ar^3$ represent the same meanings as described above. k represents an integer of 0 to 4, and $R^1$ represents an alkyl group having 1 to 10 carbon atoms, an alkoxy group having 1 to 10 carbon atoms, an aryl group having 6 to 10 carbon atoms or an aryloxy group having 6 to 10 carbon atoms.

Here, k represents an integer of 0 to 4, and preferably is 0.

As specific examples of the alkyl group having 1 to 10 carbon atoms, alkoxy group having 1 to 10 carbon atoms, aryl group having 6 to 10 carbon atoms and aryloxy group having 6 to 10 carbon atoms, for example, the same groups as described above are mentioned. As $Ar^3$, phenylene, biphenylene and the like are preferably used.

As typical examples of the segment substantially free from acid groups, there are mentioned, when Z represents —CO—, for example, segments derived from polyether ether ketone which may be substituted by a substituent as described above, and when Z represents —$SO_2$—, segments derived from polyether ether sulfone and the like which may be substituted by a substituent as described above, and when both of them are contained, polyether ether ketone ether ether sulfone and the like which may be substituted by a substituent as described above. Typical examples thereof include the following segments,

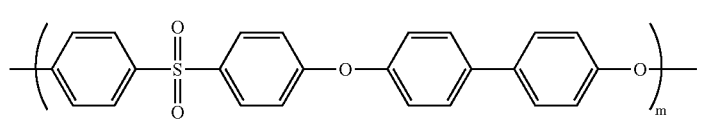

1-1

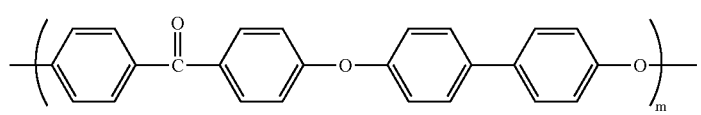

1-2

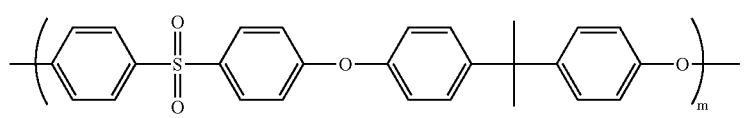

1-3

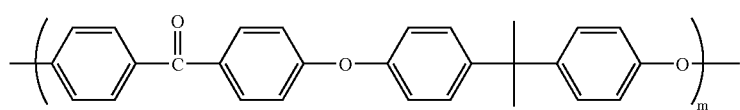

1-4

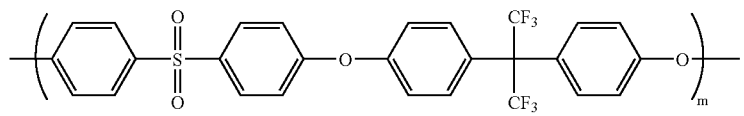

1-5

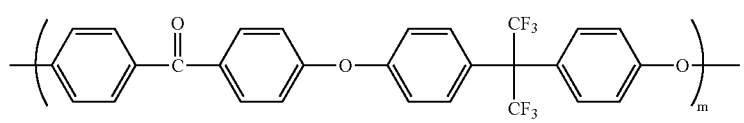

1-6

1-7

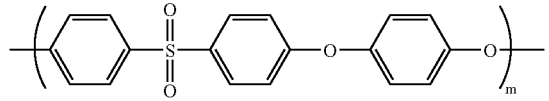

1-8

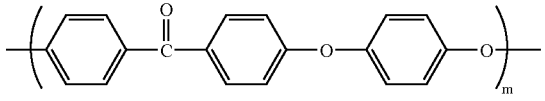

1-9

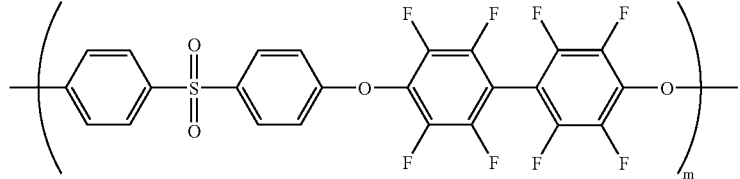

1-10

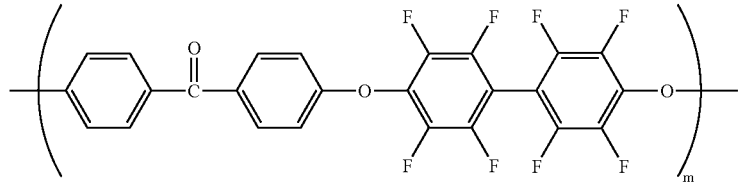

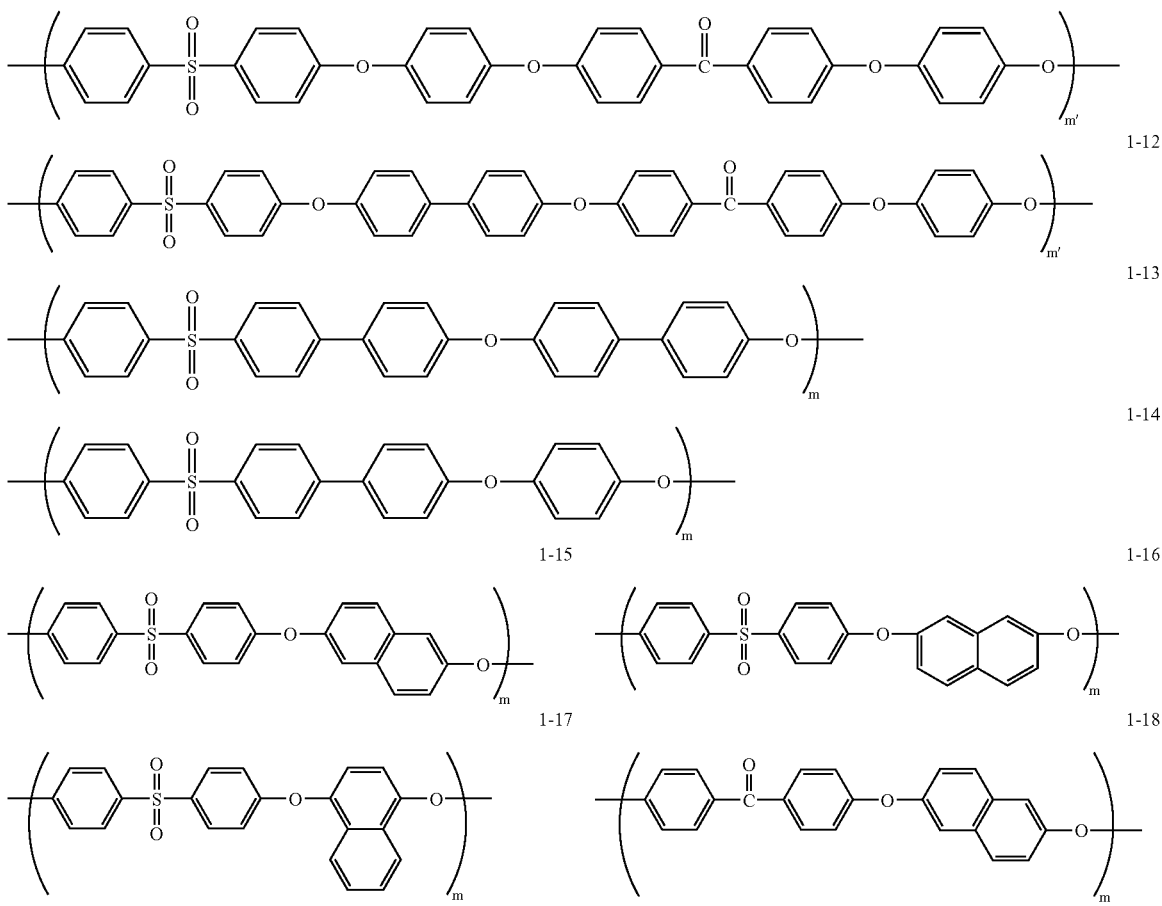

The segment substantially free from acid groups as described above is preferably selected from the above-mentioned 1-1 to 1-12.

The present invention is characterized in that it has a segment substantially free from acid groups as described above, and in addition to such a segment, it has a segment having an acid group.

Here, as the segment having an acid group, those having a content of an acid group per repeating unit constituting the segment of 0.5 or more on average are mentioned, and preferably, those having a content of an acid group per repeating unit constituting the segment of 1.0 or more on average are mentioned, and particularly, introduction into substantially all aromatic groups is preferable.

Examples of the acid group include weak acid groups such as carboxylic acid, phosphonic acid and the like, strong acid groups such as sulfonic acid and the like, super strong acid groups such as sulfonic acid acid, sulfonylimide, perfluoroalkylenesulfonic acid acid, perfluorophenylenesulfonic acid acid, perfluoroalkylenesulfonylimide and the like. Of them, strong acid groups and super strong acid groups are preferable, and for example, sulfonic acid, perfluoroalkylenesulfonic acid acid, perfluorophenylenesulfonic acid and the like are suitably used.

As the segment having an acid group, those containing a structure obtained by introducing an acid group into the above-mentioned general formula (3), (4) or (5) are preferable.

In the formula (3), n represents an integer of 10 or more. $Ar^4$ and $Ar^5$ represent mutually independently a divalent aromatic group which may be substituted by an alkyl group having 1 to 10 carbon atoms, an alkoxy group having 1 to 10 carbon atoms, an aryl group having 6 to 10 carbon atoms or an aryloxy group having 6 to 10 carbon atoms. Y represents —CO— or —SO$_2$—. Each Y in the segments represents mutually independently —CO— or —SO$_2$—.

Here, as specific examples of the alkyl group having 1 to 10 carbon atoms, alkoxy group having 1 to 10 carbon atoms, aryl group having 6 to 10 carbon atoms, aryloxy group having 6 to 10 carbon atoms, and the like, the same groups as described above are mentioned. n represents usually about 10 to 250, and it is preferable that all of Ys are identical.

As the segment having an acid group introduced into a structure of the formula (3), for example, those described below are exemplified, Though those in which the acid group is a sulfonic acid group are shown, a phosphonic acid group and a carboxyl group may be contained.

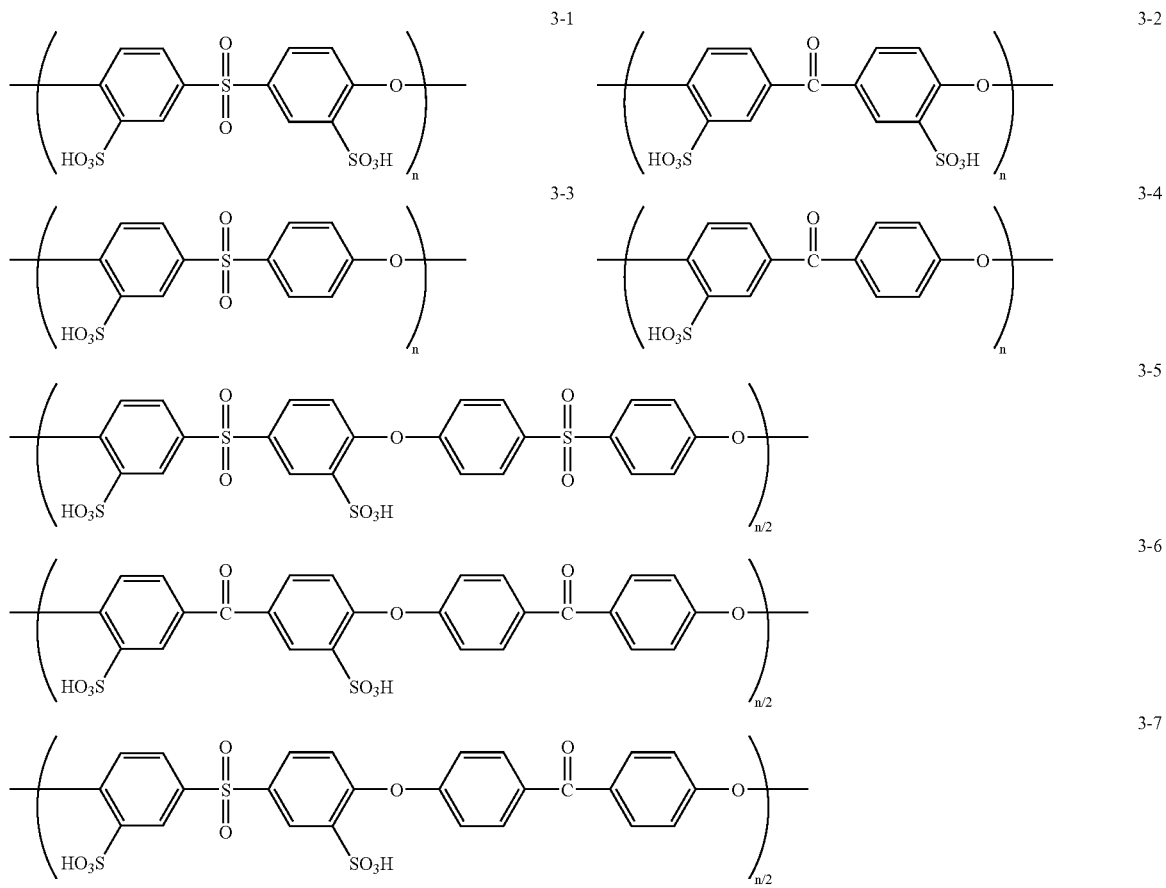

In the formula (4), n represents the same meaning as described above. $Ar^6$ $Ar^7$ and $Ar^8$ represent mutually independently a divalent aromatic group which may be substituted by an alkyl group having 1 to 10 carbon atoms, an alkoxy group having 1 to 10 carbon atoms, an aryl group having 6 to 10 carbon atoms or an aryloxy group having 6 to 10 carbon atoms. Y represents the same meaning as described above.

Here, as specific examples of the alkyl group having 1 to 10 carbon atoms, alkoxy group having 1 to 10 carbon atoms, aryl group having 6 to 10 carbon atoms, aryloxy group having 6 to 10 carbon atoms, and the like, the same groups as described above are mentioned. n represents usually about 10 to 250, and it is preferable that all of Ys are identical.

As the segment having an acid group introduced into a structure of the formula (4), for example, those described below are exemplified. Though those in which the acid group is a sulfonic acid group are shown, a phosphonic acid group and a carboxyl group may be contained.

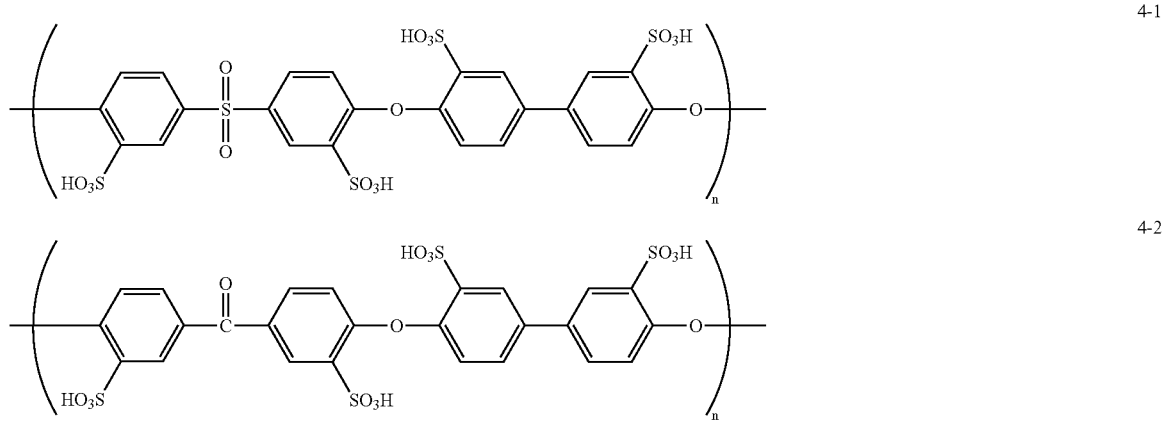

-continued
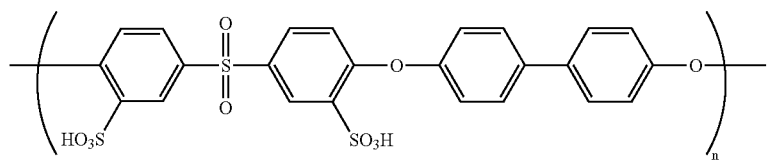
4-3
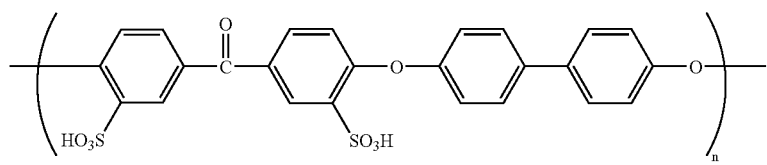
4-4
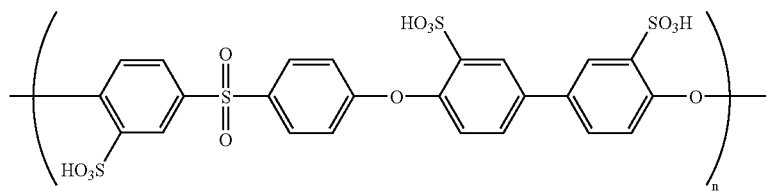
4-5
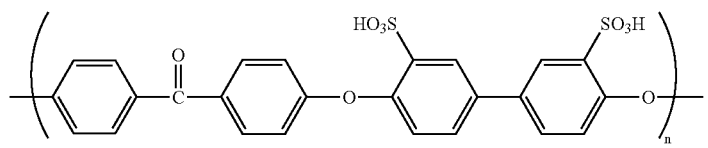
4-6
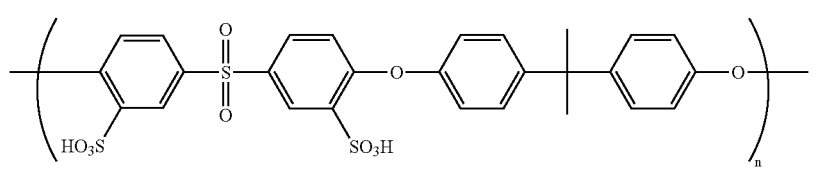
4-7
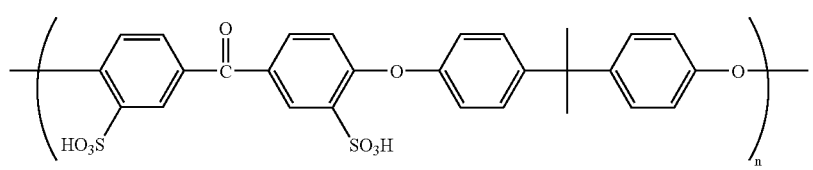
4-8
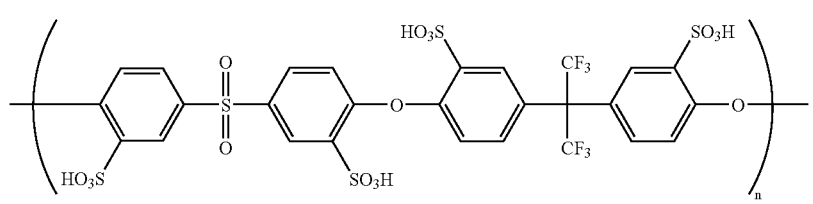
4-9
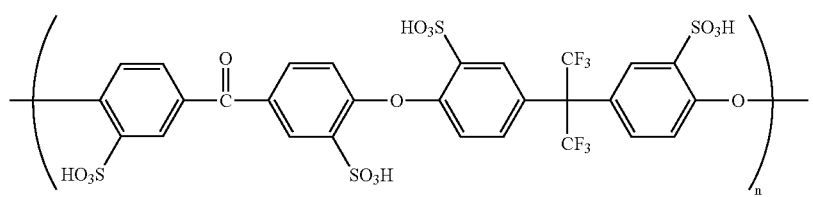
4-10
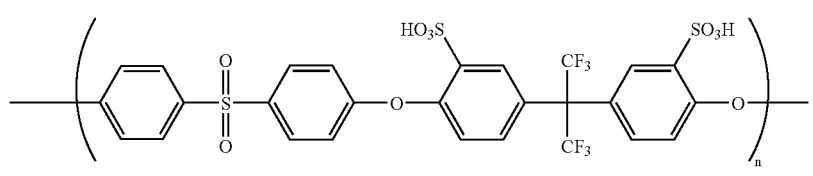
4-11

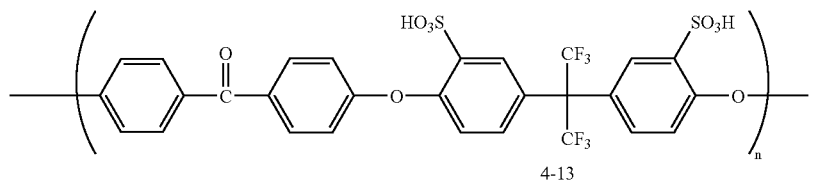

4-12

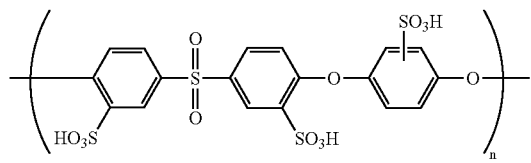

4-13

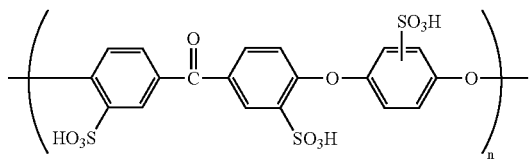

4-14

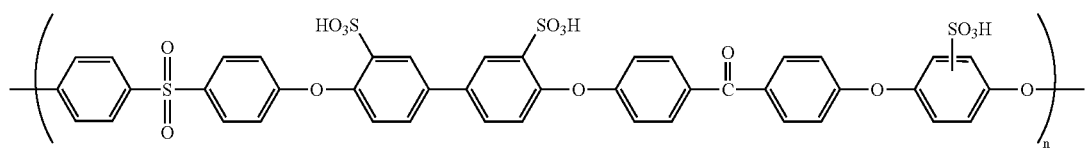

4-15

Among segments obtained by introducing an acid group into a structure of the formula (4), segments of the above-mentioned general formula (6) including the above-mentioned 4-1 to 4-4, 4-13 to 4-14 and the like, are preferable.

In the formula (5), n represents the same meaning as described above. $Ar^9$ and $Ar^{10}$ represent mutually independently a divalent aromatic group which may be substituted by an alkyl group having 1 to 10 carbon atoms, an alkoxy group having 1 to 10 carbon atoms, an aryl group having 6 to 10 carbon atoms or an aryloxy group having 6 to 10 carbon atoms.

As specific examples of the alkyl group having 1 to 10 carbon atoms, alkoxy group having 1 to 10 carbon atoms, aryl group having 6 to 10 carbon atoms, aryloxy group having 6 to 10 carbon atoms, and the like, the same groups as described above are mentioned. n represents usually about 10 to 250.

As the segment having an acid group introduced into a structure of the formula (5), for example, those described below are exemplified. Though those in which the acid group is a sulfonic acid group are shown, a phosphonic acid group and a carboxyl group may be contained.

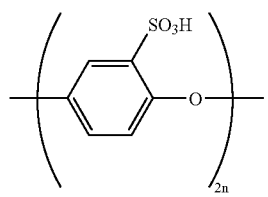

5-1

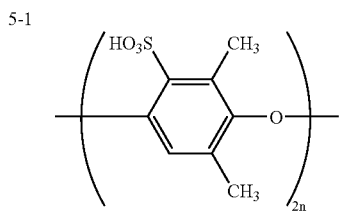

5-2

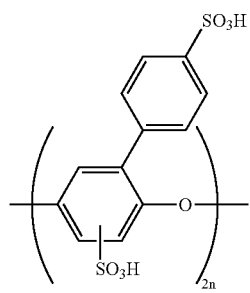

5-3

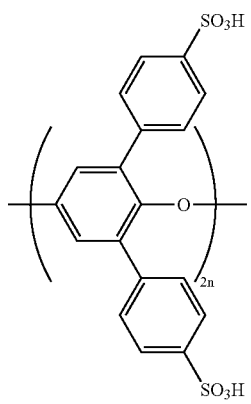

5-4

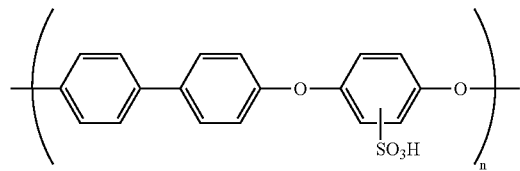
5-5
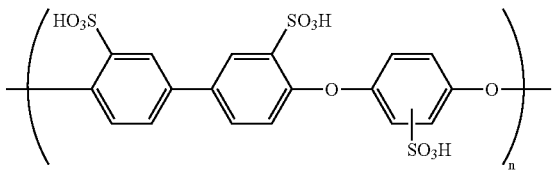
5-6
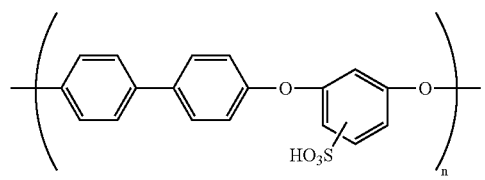
5-7
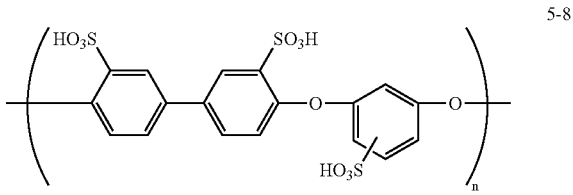
5-8
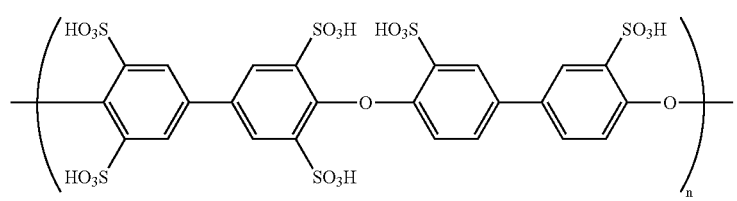
5-9
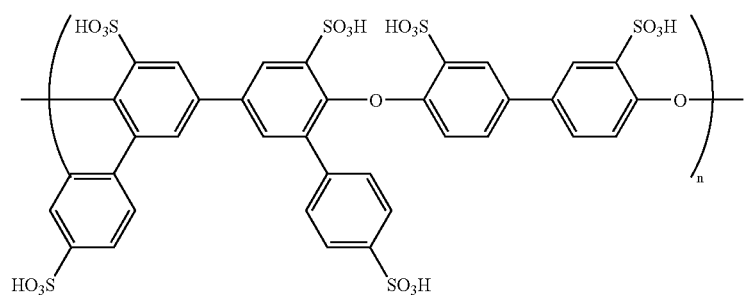
5-10
The block copolymer of the present invention comprises, as a segment, in addition to the segment (1) substantially free from acid groups as described above, a segment having an acid group, for example, a segment obtained by introducing an acid group into (3), (4) or (5), and typical examples thereof include the following block copolymers.
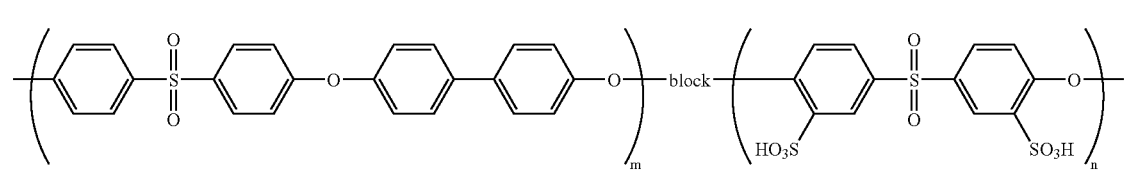
B-1
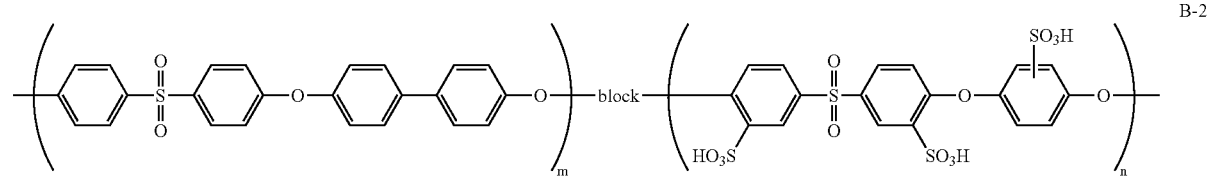
B-2

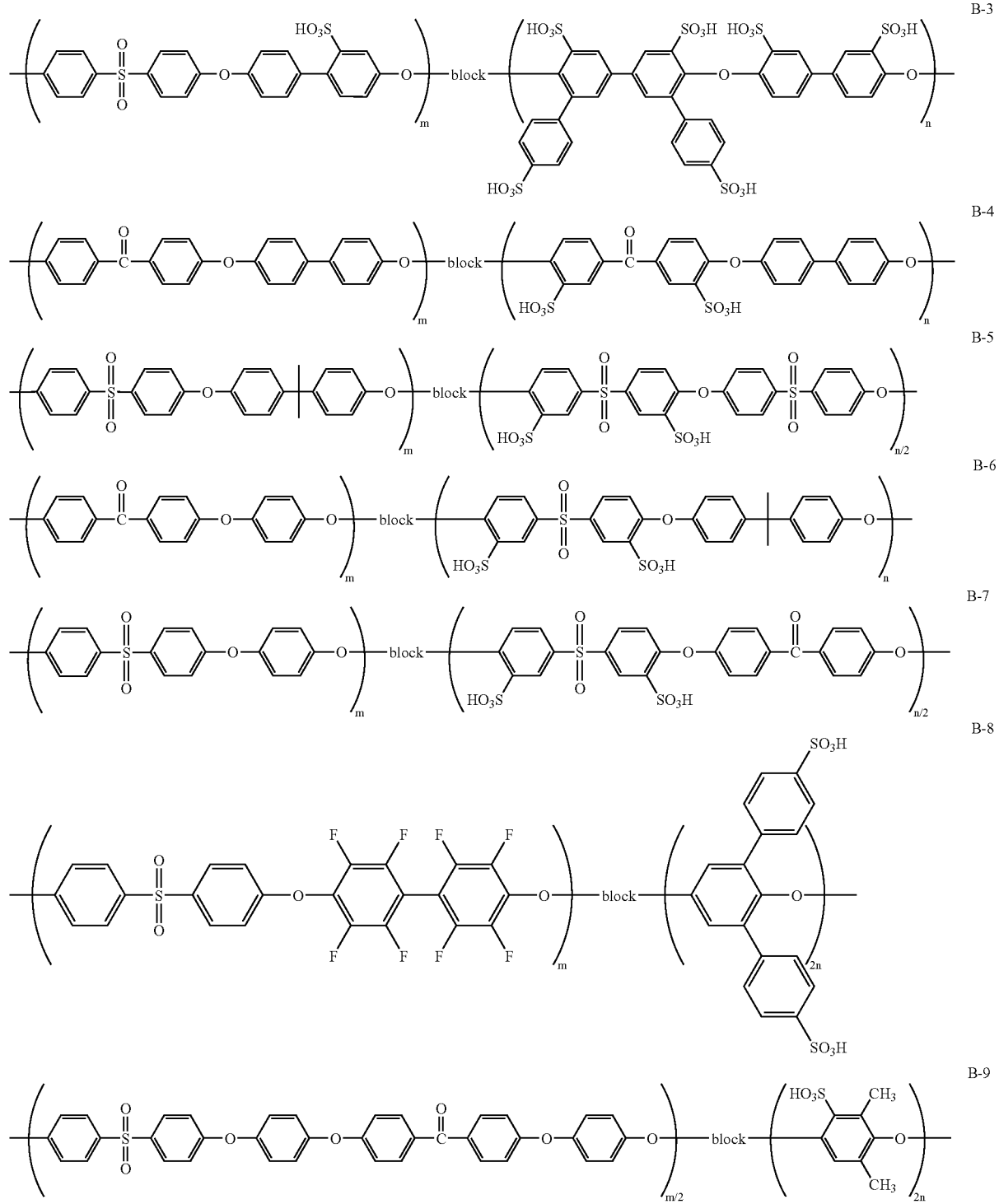

As the production method, there are listed, for example, I. a method in which a block copolymer composed of a segment (1) free from acid groups and a segment (3), (4) or (5) is produced, then, an acid group is introduced selectively into the segment (3), (4) or (5), II. a method in which a polymer having an acid group introduced into a segment (3), (4) or (5) is produced which is then bonded to a polymer composed of a segment (1) to obtain a block copolymer, III. a method combining the above-mentioned methods I and II, and the like.

Here, the block copolymer composed of a segment (1) substantially free from acid groups and a segment (3), (4) or (5) can be produced by combining and reacting a polymer having a segment (1) and in which both ends are composed of a hydroxyl group or halogen atom or one end thereof is composed of a hydroxyl group and another end is composed of a halogen atom with a polymer having a segment (3), (4) or (5) and in which both ends are composed of a hydroxyl group or halogen atom or one end thereof is composed of a hydroxyl group and another end is composed of a halogen atom.

For example, a. a method in which a polymer carrying a hydroxyl group on both ends and a polymer carrying a halogeno group on both ends are condensed in nucleophilic substitution manner under the action of a base, b. a method in which a polymer carrying a hydroxyl group on one end and a halogeno group on another end and another polymer carrying a hydroxyl group on one end and a halogeno group on another end are condensed in nucleophilic substitution manner under the action of a base, c. a method in which a polymer carrying a hydroxyl group on both ends and another polymer carrying a hydroxyl group on both ends are bonded using a compound acting as a connecting group such as 4,4'-difluorobenzophenone, decafluorobiphenyl, hexafluorobenzene, 4,4'-difluorodiphenylsulfone and the like, d. a method in which a polymer carrying a halogeno group on both ends and another polymer carrying a halogeno group on both ends are bonded using a compound acting as a connecting group such as 4,4'-dihydroxybiphenyl, bisphenol A, 4,4'-dihydroxybenzophenone, 4,4'-diydroxydiphenylsulfone and the like, or by a de-halogen condensation reaction, and the like, are exemplified. Also, the block copolymer can be produced by a polymerization reaction of a monomer and a polymer having a reactive group capable of causing the same reaction as the above-mentioned reaction. The polymers here can be produced according to known methods.

Here, in producing a block copolymer using a connecting group as described in the above-mentioned method c, a block copolymer having a branched structure can be produced by controlling the reaction conditions in the case of using a poly-functional connecting group such as decafluorobiphenyl, hexafluorobenzene and the like.

In this case, a block copolymer having a linear structure and a block copolymer having a branched structure can be produced severally by changing the charging composition of a polymer having a segment free from acid groups of the formula (1) and a polymer having a segment of the formula (3), (4) or (5)

As the method of introducing an acid group into a block copolymer composed of a segment (1) free from acid groups and a segment (3), (4) or (5), there is, for example, I-1. a method in which a sulfonic acid group is introduced by dissolving or suspending a block copolymer in concentrated sulfuric acid or fuming sulfuric acid, or by dissolving at least partially a block copolymer in an organic solvent, then, allowing concentrated sulfuric acid, chlorosulfuric acid, fuming sulfuric acid, sulfur trioxide and the like to act on this.

When a block copolymer Is produced using the above-mentioned method II, namely, by producing a polymer having an acid group introduced into (3), (4) or (5), then, bonding this to a polymer composed of a segment (1), for example, the segment having an acid group introduced into (3), (4) or (5) can be produced according to the above-mentioned acid group introducing method I-1 (II-1), or can be produced by polymerizing a monomer having a previously introduced acid group (II-2). Also, the block copolymer can be produced, for example, by the same method as described above.

Here, for introducing a certain amount of sulfonic acid group under strict control into an aromatic group of (3), (4) or (5) in the block copolymer, an excellent result can be obtained by using the method II rather than using the method I for preventing sulfonation of an aromatic ring in a segment (1).

The block copolymer obtained by the above-mentioned method and the like can be identified by NMR, GPC, IR and the like.

Thus, a block copolymer of the present invention is obtained, and the weight composition ratio of a segment having an acid group to a segment substantially free from acid groups is not particularly restricted, and usually from 3:97 to 70:30, preferably from 5:95 to 40:60, further preferably from 10:90 to 33:67, particularly preferably from 15:85 to 30:70. When the amount of a segment having an acid group is too small, proton conductivity lowers and a function as a polymer electrolyte for fuel cells becomes insufficient in some cases, while when the amount of a segment having an acid group is too large, water resistance becomes undesirably poor in some cases.

The content of an acid group in the whole block copolymer is preferably from 0.1 mmol to 4.0 mmol per g of a polymer electrolyte as a block copolymer (ion exchange capacity: 0.1 meq/g to 4.0 meq/g), and in terms of ion exchange capacity, particularly preferably from 0.8 meq/g to 2.4 meq/g, and especially preferably from 1.3 meq/g to 2.0 meq/g. When the acid group content is too small, proton conductivity lowers and a function as a polymer electrolyte for fuel cells becomes insufficient in some cases, while when the acid group content is too large, water resistance becomes undesirably poor in some cases. The content of an acid group can be quantified by a titration method, NMR and the like.

The acid group introduction amount of the whole block copolymer can be optionally controlled by changing the number of an acid group in a segment having the introduced acid group and/or block composition and/or number-average molecular weight of each block.

The average molecular weight of a block copolymer of the present invention is preferably 5000 to 1000000, particularly preferably 15000 to 200000 in terms of number-average molecular weight reduced by polystyrene.

The average molecular weight of a segment having an acid group is preferably 2000 to 100000, particularly preferably 4000 to 50000 in terms of number-average molecular weight reduced by polystyrene. The average molecular weight of a segment substantially free from acid groups is preferably 5000 to 200000, particularly preferably 10000 to 100000 in terms of number-average molecular weight reduced by polystyrene.

The block copolymer of the present invention contains at least one segment having an acid group and at least one segment substantially free from acid groups, and cases of so-called multi block such as a case in which at least one of them is present in plural number, a case in which both segments are present each in plural number, are particularly preferable.

Next, a case using a block copolymer of the present invention as a barrier membrane of an electrochemical device of fuel cells and the like is described below.

In this case, the block copolymer of the present invention is usually used in the form of film, and a method of converting into a film is not particularly restricted, and for example, a method of forming a membrane from solution condition (solution cast method) is preferably used.

Specifically, a copolymer is dissolved In a suitable solvent, the solution is flow-cast on a glass plate, and the solvent is removed to form a membrane. The solvent used of membrane formation is not particularly restricted providing it can dissolve a copolymer and thereafter it can be removed, and aprotic polar solvents such as N,N-dimethylformamide (DMF), N,N-dimethylacetamide (DMAc), N-methyl-2-pyrrolidone (NMP), dimethyl sulfoxide (DMSO) and the like, chlorine-based solvents such as dichloromethane, chloroform, 1,2-dichloroethane, chlorobenzene, dichlorobenzene and the like, alcohols such as methanol, ethanol, propanol and the like, and alkylene glycol monoalkyl ethers such as ethylene glycol monomethyl ether, ethylene glycol monoethyl ether, propylene glycol monomethyl ether, propylene glycol monoethyl ether and the like, are suitably used. Though these can be used singly, if necessary, two or more solvents can also be used in admixture, Among them, dimethyl sulfoxide, N,N-dimethylformamide, N,N-dimethylacetamice, N-methylpyrrolidone and the like are preferable since they manifest high solubility of a polymer.

The thickness of a film is not particularly restricted, and preferably from 10 to 300 μm, particularly preferably from 20 to 100 μm. When thinner than 10 μm, practical strength is not sufficient in some cases, and when thicker than 300 μm, membrane resistance tends to increase to lower the property of an electrochemical device. The membrane thickness can be controlled by the concentration of a solution and the applied thickness on a substrate.

For the purpose of improving various physical properties of a film, plasticizers, stabilizers, releasing agents and the like used in usual polymers can be added to a block copolymer of the present invention. Further, other polymers can also be made into a composite alloy together with a copolymer of the present invention by a method of mixed co-casting in an identical solvent, and the like.

Additionally, for making water control easy in a fuel cell application, it is also known to add inorganic or organic fine particles as a water holding agent. Any of these known methods can be used providing they do not act counter to the object of the present Invention.

Further, it is also possible to cross-link a film by irradiation with electron beam, radiation and the like for the purpose of improving the mechanical strength of a film, and the like.

For further improving the strength, flexibility and durability of a polymer electrolyte membrane, it is also possible to impregnate a porous substrate with a polymer electrolyte of the present invention, to give a composite membrane. For compositing, known methods can be used. The porous substrate is not particularly restricted providing it satisfies the above-mentioned use object, and for example, porous membranes, woven fabrics, non-woven fabrics, fibrils and the like are mentioned and can be used irrespective of its shape and material.

When a polymer electrolyte composite membrane using a block copolymer of the present invention is used as a barrier membrane of a polymer electrolyte fuel cell, the porous substrate has a membrane thickness of 1 to 100 μm, preferably 3 to 30 μm, further preferably 5 to 20 μm, a pore diameter of 0.01 to 100 μm, preferably 0.02 to 10 μm, and a void percentage of 20 to 98%, preferably 40 to 95%.

When the membrane thickness of a porous substrate is too small, an effect of reinforcing strength after compositing or a reinforcing effect of imparting flexibility and durability becomes insufficient, and gas leakage (cross leak) tends to occur. When the membrane thickness is too large, electric resistance increases, and the resulting composite membrane becomes in sufficient as a barrier membrane of a solid polymer fuel cell. When the pore diameter is too small, filling of a polymer solid electrolyte is difficult, and when too large, a reinforcing effect for a polymer solid electrolyte becomes weak. When the void percentage is too small, resistance as a solid electrolyte membrane increases, and when too large, the strength of a porous substrate itself generally becomes weak to lower a reinforcing effect.

In view of heat resistance and an effect of reinforcing physical strength, aliphatic polymers, aromatic polymers or fluorine-containing polymers are preferable.

Next, the fuel cell of the present invention is described.

As the fuel cell using a polymer electrolyte, there are, for example, a solid polymer fuel cell using a hydrogen gas as a fuel, and a direct methanol solid polymer fuel cell directly feeding methanol as a fuel, and the copolymer of the present invention can be suitably used for both of them.

The fuel cell of the present invention includes that using a copolymer of the present invention as a polymer electrolyte membrane and/or polymer electrolyte composite membrane, that using a polymer electrolyte of the present invention as a polymer electrolyte in a catalyst layer, and the like.

The fuel cell using a copolymer of the present invention as a polymer electrolyte membrane and/or polymer electrolyte composite membrane can be produced by conjugating a catalyst and a gas diffusion layer to both surfaces of a polymer electrolyte membrane and/or polymer electrolyte composite membrane. As the gas diffusion layer, known materials can be used, and porous carbon woven fabric, carbon non-woven fabric or carbon paper is preferable for efficiently transporting a raw material gas to a catalyst.

Here, the catalyst is not particularly restricted providing it can activate a redox reaction with hydrogen or oxygen, and known catalysts can be used, and preferable is use of platinum fine particles. Platinum fine particles are often carried on particulate or fibrous carbon such as activated carbon, graphite and the like, and preferably used, Further, platinum carried on carbon is mixed together with an alcohol solution of a perfluoroalkylsulfonic acid acid resin as a polymer electrolyte to give a paste which is applied on a gas diffusion layer and/or polymer electrolyte membrane and/or polymer electrolyte composite membrane and dried to obtain a catalyst layer. Specifically, known methods such as a method described, for example, in J. Electrochem. Soc.: Electrochemical Science and Technology, 1988, 135 (9), 2209 can be used.

As the fuel cell using a copolymer of the present invention as a polymer electrolyte in a catalyst layer, those using a copolymer of the present invention instead of a perfluoroalkylsulfonic acid acid resin constituting the above-mentioned catalyst layer are mentioned. As the solvent which can be used in obtaining a catalyst layer using a copolymer of the present invention, the same solvents as listed as the solvent which can be used in forming a membrane of a copolymer are mentioned. When a catalyst layer using a copolymer of the present invention is used, the polymer electrolyte membrane is not limited to a membrane using a copolymer of the present invention, and known polymer electrolyte membranes can be used.

The present invention is described by the following examples, but the scope of the invention is not limited to these examples at all, Measurement of Molecular Weight The number-average molecular weight (Mn) reduced by polystyrene was measured under the following conditions by gel permeation chromatography (GPC).

GPC measurement apparatus: manufactured by TOSOH; HLC-8220

Column: manufactured by Shodex; two AT-80M's are connected in series

Column temperature: 40° C.

Mobile phase solvent. DMAc (LiBr is added so as to give 10 mmol/dm$^3$)

Solvent flow rate: 0.5 mL/min

Measurement of Proton Conductivity:

Proton conductivity was measured by an alternating current method under a temperature of 80° C. and a relative humidity of 90%.

Measurement of Ion Exchange Capacity:

Ion exchange capacity was measured by a titration method.

Measurement of Water Absorption Coefficient:

A dried film is immersed in deionized water at 100° C. for 2 hours, then, increase in the film weight was measured as a criterion for the weight in drying.

Porous Substrate

A polyethylene porous membrane described below produced according to Japanese Patent Application Laid-Open (JP-A) No. 2002-309024 was used. The average pore diameter shows a value measured by a bubble point method, ASTM F316-86.

Polyethylene porous membrane A: average pore diameter d=60 nm

REFERENCE EXAMPLE 1

Production of polyether sulfone copolymer (both end-OH type)

Into a 500 ml flask equipped with a distillation tube was added 24.43 g of 4,4'-difluorodiphenylsulfone, 18.99 g of 4,4'dihydroxybiphenyl, 14.78 g of potassium carbonate, 200 ml of NMP and 80 ml of toluene under an Ar atmosphere, and the mixture was thermally insulated at 130° C. for 4 hours to azeotropically remove water in the system. Thereafter, the mixture was heated up to 170° C. and reacted at this temperature for 6 hours. After allowing this to cool, the reaction mixture was added to 1000 ml of methanol and the mixture was stirred for 1 hour. The resultant precipitate was filtrated and pulverized in the form of powder, and washed with water, then, washed again with methanol, and dried under reduced pressure at 60° C. to obtain 38.78 g of a polymer carrying an OH group on both ends (hereinafter, P1).

REFERENCE EXAMPLE 2

Into a 500 ml flask equipped with a distillation tube was added 35.00 g of the above-mentioned P1, 0.31 g of potassium carbonate, 100 ml of NMP and 40 ml of toluene under an Ar atmosphere, and the mixture was thermally insulated at 150° C. for 3 hours while stirring to azeotropically remove water in the system. Thereafter, 2.34 g of decafluorobiphenyl was dissolved in 15 ml of NMP and added to the system, and the mixture was stirred at room temperature for 20 minutes, then, reacted at 80° C. for 5 hours. After allowing it to cool, the reaction mixture was added to 1000 ml of methanol and stirred for 1 hour, the resultant precipitate was filtrated and pulverized in the form of powder, and washed with water, then, washed with hot methanol, and dried under reduced pressure at 60° C. to obtain 36.10 g of a polymer carrying a F group on both ends (hereinafter, P2).

EXAMPLE 1

Production of Block Copolymer

Into a flask equipped with an azeotropic distillation apparatus was added 2.33 g of potassium 2,5-dihydroxybenzenesullfonate, 4.91 g of 3,3'-sulfonylbis(potassium 6-fluorobenzenesulfonate). 1.48 g of potassium carbonate and 15 g of 18-crown-6 under an Ar atmosphere, and 90 mL of NMP and 40 mL of toluene were added. Thereafter, toluene was distilled off with heating at a bath temperature of 150° C. to cause azeotropic dehydration In the system, and the mixture was stirred while keeping at 170° C. for 5 hours, to obtain a hydrophilic oligomer. Subsequently, the reaction mixture was allowed to cool to room temperature, then, 9.0 g of chain-end-fluorinated polyether sulfone synthesized according to the conditions in Reference Example 1 (P2) was added, thereafter, the mixture was stirred while keeping at 140° C. for 15 hours. The reaction mixture was allowed to cool, then, dropped into hydrochloric acid water, and the produced precipitate was recovered by filtration. Further, washing with water and filtration were repeated until the washing liquid became neutral, then, the precipitate was dried under reduced pressure at 60° C., to obtain 13.41 g of a block copolymer described below.

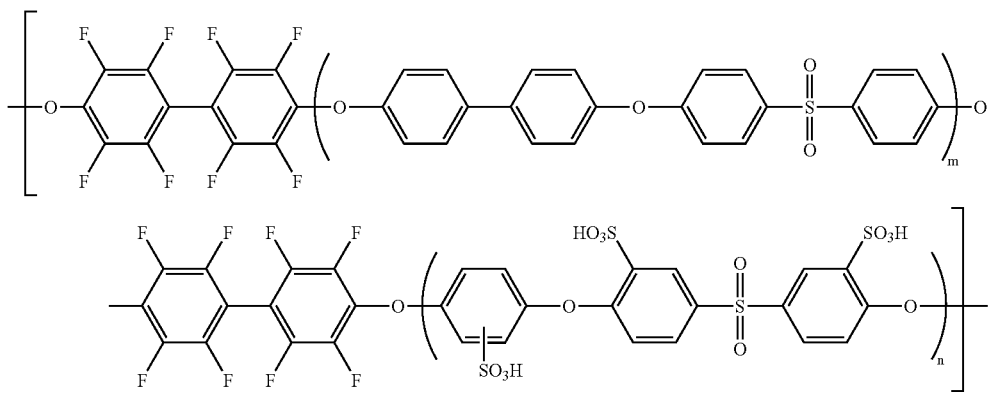

Number-average molecular weight: $Mn=9.7\times10^4$

Water absorption coefficient; 29%

Ion exchange capacity: 0.98 meq/g

Proton conductivity: $4.78\times10^{-2}$ S/cm

From the Ion exchange capacity, the weight composition ratio of a segment having an introduced acid group to a segment substantially free from introduced acid groups was calculated to be 18:82.

EXAMPLE 2

Into a flask equipped with a distillation tube was added 5.61 g (35 mmol) of 2,6-dihydroxynaphthalene, 5.08 g (36.8 mmol) of potassium carbonate, 88 mL of dimethyl sulfoxide, and 45 mL of toluene under an Ar atmosphere and the mixture was stirred. Then, the mixture was heated up to 130° C. and thermally insulated for 3 hours at the same temperature, to azeotropically remove water in the system together with toluene. After allowing it too cool, 7.52 g (29.6 mmol) of 4,4'-difluorodiphenylsulfone was added and the mixture was heated up to 135° C. and reacted at the same temperature for 3 hours.

Into a flask equipped with a distillation tube was added 2.97 g (13 mmol) of potassium hydrozuinonesulfonate, 1.81 g (13.7 mmol) of potassium carbonate, 40 mL of dimethyl sulfoxide, and 20 mL of toluene under an Ar atmosphere and the mixture was stirred. Then, the mixture was heated up to 130° C. and thermally insulated for 3 hours at the same temperature, to azeotropically remove water in the system together with toluene. After allowing it to cool, 9.51 g (19.4 mmol) of dipotassium 4,4'-difluorodiphenylsulfone-3,3'-disulfonate was added and the mixture was heated up to 138° C. and reacted at the same temperature for 3 hours.

These two reaction masses were combined while diluting with 30 ml of DMSO and the mixture was reacted at 130° C. for 7 hours and at 140° C. for 7 hours.

After allowing it to cool, the mixture was dropped into a large amount of methanol and the produced precipitate was recovered by filtration. Then, the produce was washed with a large amount of 4 N hydrochloric acid, then, washing with water and filtration were repeated until the washing liquid became neutral. A treatment with an excess amount of hot water for two hours was repeated twice, then, the product was dried under reduced pressure to obtain 16.3 g of a polymer electrolyte.

This was subjected to high resolution NMR analysis to confirm the following structure.

Then, the resultant polymer electrolyte was dissolved in N-methylpyrrolidone (NMP) to give a solution which was subjected to cast membrane formation to obtain data of the resultant polymer electrolyte membrane as described below.

Proton conductivity: $1.4 \times 10^{-1}$ S/cm

Membrane thickness: 21 μm

Water absorption coefficient: 119%

EXAMPLE 3

A polyethylene porous membrane A was fixed on a glass plate, the polymer electrolyte obtained in Example 2 was dissolved in NMP to prepare a polymer electrolyte solution which was dropped on the fixed polyethylene porous membrane A. The polymer electrolyte solution was applied uniformly on the porous membrane using a bar coater, and the applied thickness was controlled using a bar coater, and dried at 80° C. under normal pressure. Then, it was immersed in 1 mol/L hydrochloric acid, further washed with ion exchanged water to obtain a polymer electrolyte composite membrane.

Ion exchange capacity: 1.64 meq/g

Proton conductivity: $1.16 \times 10^{-1}$ S/cm

Membrane thickness; 81 μm (NMP solution cast membrane formation)

Water absorption coefficient: 100%

COMPARATIVE EXAMPLE 1

2.5 g of an end chloro type polyethersulfone described below

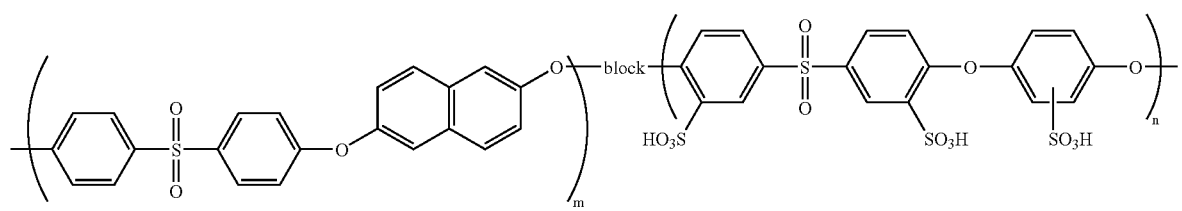

Number-average molecular weight: $Mn = 5.2 \times 10^4$

Ion exchange capacity: 1.86 meq/g

From the Ion exchange capacity, the weight composition ratio of a segment having an introduced acid group to a segment substantially free from introduced acid groups was calculated to be 35:65.

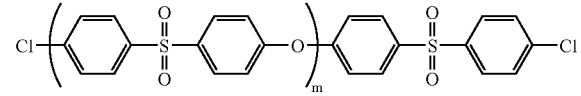

(Sumika Excell PES 5200P manufactured by Sumitomo Chemical Co., Ltd., Mn=$5.44\times10^4$, Mw=$1.23\times10^5$: GPC, polystyrene standard), 2.50 g of a polyethersulfone copolymer described below

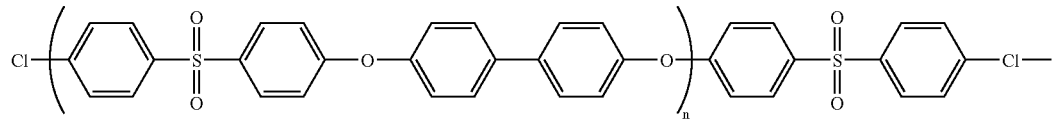

(produced according to a method described in Example 1 of JP-A No. 2002-220469. Mn=$3.16\times10^4$, MW=$8.68\times10^4$) and 0.117 g (0.75 mmol) of 2,2'-bipyridyl were dissolved in 200 mL of DMAc under an argon atmosphere, and bubbling with an argon gas was performed for 30 minutes, and 0.206 g (0.75 mmol) of Ni(COD)$_2$ was added and the mixture was heated up to 80° C., and stirred while thermally insulating at the same temperature for 6 hours, then, allowed to cool. Then, the reaction mixture as poured into 500 mL of 4 N hydrochloric acid, and the produced white precipitate was filtrated, and purified by re-precipitation by an ordinary method, to obtain an aromatic polyether-based ultrahigh polymer described below.

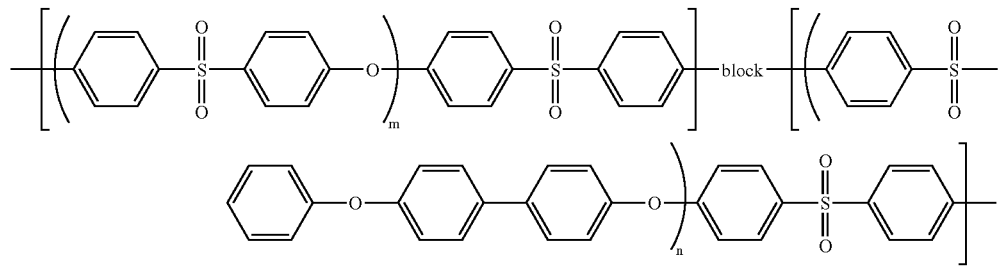

Mn=$1.89\times10^6$

Mw=$2.17\times10^6$ 5 g of the above-mentioned aromatic polyether-based ultrahigh polymer was used and sulfonated and purified according to an ordinary method using concentrated sulfuric acid, to obtain an aromatic polyether-based ion conductive ultrahigh polymer shown below. As a result of $^1$H-NMR measurement, it was found that a biphenyl unit was selectively sulfonated as described in the following formula.

Ion exchange capacity: 1.77 meq/g

Proton conductivity: $9.14\times10^{-2}$ S/cm

Water absorption coefficient: 152%

From the ion exchange capacity, the weight composition ratio of a segment having an introduced acid group to a segment substantially free from introduced acid groups was calculated to be 50:50.

The block copolymer of the present invention shows excellent performances in various properties such as a membrane forming property, chemical stabilities such as oxidation resistance, radical resistance, hydrolysis resistance and the like, membrane mechanical strength, water resistance and proton conductivity and the like, as a proton conductive membrane for polymer electrolytes, particularly, fuel cells. It is excellent particularly in proton conductivity and water resistance. In addition, the block copolymer of the present invention is industrially advantageous as a polymer electrolytes, particularly as proton conductive membranes for fuel cells since it shows a high power generation property.

The invention claimed is:

1. A block copolymer comprising at least one segment having an acid group and at least one segment substantially free from acid groups, wherein the segment substantially free from acid groups contains a repeating structure of the following formula (1):

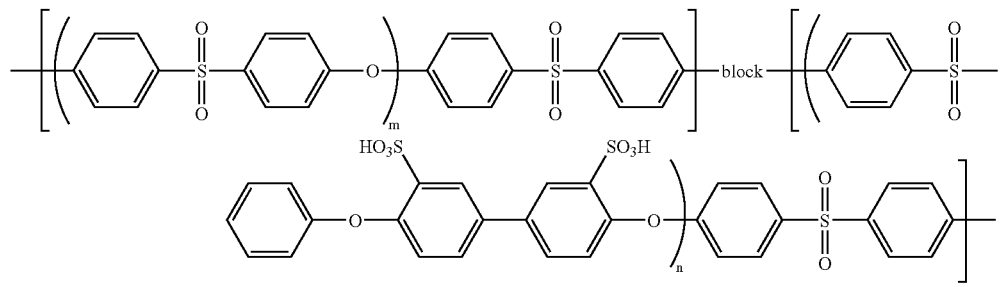

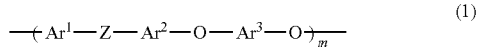

(1)

wherein m represents an integer of 10 or more; $Ar^1$, $Ar^2$, and $Ar^3$ mutually independently represent a divalent aromatic group, wherein the divalent aromatic group may be substituted by an alkyl group having 1 to 10 total carbon atoms, an alkoxy group having 1 to 10 total carbon atoms, an aryl group having 6 to 10 total carbon atoms, or an aryloxy group having 6 to 10 total carbon atoms; and Z represents —CO— or —$SO_2$—, each Z in the segments representing independently —CO— or —$SO_2$—;

wherein the segment having an acid group is the following general formula (6):

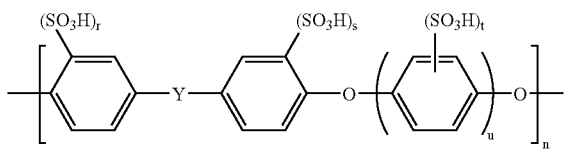

(6)

wherein n represents an integer of 10 or more, Y represents —CO— or —$SO_2$—, each Y in the segments representing independently —CO— or —$SO_2$—, r represents 0 or 1, s represents 0 or 1, r+s being 1 or 2, t represents 1 or 2, and u represents 1 or 2.

2. The block copolymer according to claim 1, wherein the weight composition ratio of the segment having an acid group to the segment substantially free from acid groups is 3:97 to 70:30.

3. The block copolymer according to claim 1, wherein the acid group is a strong acid group or a super strong acid group.

4. The block copolymer according to claim 1, wherein the ion exchange capacity is from 0.1 meq/g to 4 meq/g.

5. The block copolymer according to claim 1, wherein the segment substantially free from acid groups is the following general formula (2):

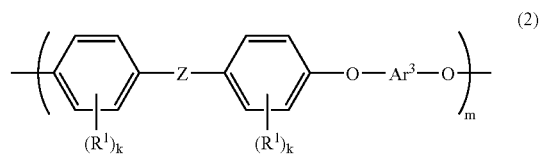

(2)

(wherein, m, Z and $Ar^3$ represent the same meanings as described above, k represents an integer of 0 to 4, and $R^1$ represents an alkyl group having 1 to 10 carbon atoms, an alkoxy group having 1 to 10 carbon atoms, an aryl group having 6 to 10 carbon atoms or an aryloxy group having 6 to 10 carbon atoms).

6. A polymer electrolyte comprising the copolymer according to claim 1 as an effective component.

7. A polymer electrolyte membrane comprising the polymer electrolyte according to claim 6.

8. A polymer electrolyte composite membrane comprising the polymer electrolyte according to claim 6, and a porous substrate.

9. A catalyst composition comprising the polymer electrolyte according to claim 6.

10. A polymer electrolyte fuel cell comprising the polymer electrolyte membrane according to claim 7.

11. A polymer electrolyte fuel cell comprising the polymer electrolyte membrane according to claim 8.

12. A polymer electrolyte fuel cell comprising the catalyst composition according to claim 9.

* * * * *